United States Patent
Lara et al.

(10) Patent No.: US 10,794,156 B2
(45) Date of Patent: Oct. 6, 2020

(54) MULTI-BORE JUMPER INTERFACE

(71) Applicant: OneSubsea IP UK Limited, London (GB)

(72) Inventors: Marcus Lara, Cypress, TX (US);
Akshay Kalia, Houston, TX (US);
Brian Bibighaus, Houston, TX (US)

(73) Assignee: OneSubsea IP UK Limited, London (GB)

( * ) Notice: Subject to any disclaimer, the term of this patent is extended or adjusted under 35 U.S.C. 154(b) by 0 days.

(21) Appl. No.: 15/840,593

(22) Filed: Dec. 13, 2017

(65) Prior Publication Data
US 2019/0178060 A1 Jun. 13, 2019

(51) Int. Cl.
| E21B 17/02 | (2006.01) |
| E21B 17/18 | (2006.01) |
| E21B 43/013 | (2006.01) |
| F16L 1/26 | (2006.01) |
| E21B 19/00 | (2006.01) |
| E21B 43/01 | (2006.01) |
| E21B 33/038 | (2006.01) |
| F16L 9/19 | (2006.01) |
| F16L 3/16 | (2006.01) |

(52) U.S. Cl.
CPC ............ E21B 43/013 (2013.01); E21B 17/02 (2013.01); E21B 17/18 (2013.01); E21B 19/002 (2013.01); E21B 43/0107 (2013.01); F16L 1/26 (2013.01); E21B 33/038 (2013.01); F16L 3/16 (2013.01); F16L 9/20 (2013.01)

(58) Field of Classification Search
None
See application file for complete search history.

(56) References Cited

U.S. PATENT DOCUMENTS

| 4,086,778 | A | 5/1978 | Latham et al. |
| 6,098,715 | A | 8/2000 | Seixas et al. |
| 6,231,265 | B1* | 5/2001 | Rytlewski ............... E21B 17/02 166/341 |
| 6,419,277 | B1 | 7/2002 | Reynolds |
| 6,682,105 | B2 | 1/2004 | Latham et al. |
| 6,698,800 | B2 | 3/2004 | Spiering et al. |
| 7,112,009 | B2 | 9/2006 | Mackinnon |
| 7,467,662 | B2* | 12/2008 | Smith ................. E21B 33/0385 166/343 |

(Continued)

FOREIGN PATENT DOCUMENTS

GB  2375381 A  11/2002

OTHER PUBLICATIONS

Extended European Search Report issued in European Patent Appl. No. 18211118.7 dated Apr. 17, 2019; 8 pages.

*Primary Examiner* — Matthew R Buck
*Assistant Examiner* — Douglas S Wood
(74) *Attorney, Agent, or Firm* — Helene Raybaud

(57) ABSTRACT

A vertical multi-bore jumper. The jumper is outfitted with interfaces that include rotatable hubs accommodating perimeter bore terminations that may be rotated about a central production bore. In this manner, the multiple bores may be flexibly aligned with corresponding couplers at equipment located on the seabed. As a result, undue torque is not placed on the jumper in attempting to align multiple bores at the interfaces which may be frequently misaligned at the outset of such installations.

17 Claims, 7 Drawing Sheets

(56) References Cited

U.S. PATENT DOCUMENTS

| | | | |
|---|---|---|---|
| 8,100,182 B2 * | 1/2012 | Smith | E21B 43/013 |
| | | | 166/339 |
| 8,408,842 B2 | 4/2013 | Cafaro et al. | |
| 8,961,070 B1 * | 2/2015 | Mascarenhas | F16L 1/12 |
| | | | 405/170 |
| 9,068,676 B2 * | 6/2015 | Morck | E21B 43/0107 |
| 9,080,699 B2 * | 7/2015 | Larsson | E21B 43/0107 |
| 9,163,486 B2 | 10/2015 | Lugo | |
| 9,784,074 B1 | 10/2017 | Hellums et al. | |
| 2001/0034153 A1 | 10/2001 | McIntosh et al. | |

* cited by examiner

MULTI-BORE JUMPER INTERFACE

BACKGROUND

Exploring, drilling and completing hydrocarbon and other wells are generally complicated, time consuming and ultimately very expensive endeavors. As a result, over the years, well architecture has become more sophisticated where appropriate in order to help enhance access to underground hydrocarbon reserves. For example, as opposed to land based oilfields accommodating wells of limited depth, it is not uncommon to find offshore oilfields with wells exceeding tens of thousands of feet in depth. Furthermore, today's hydrocarbon wells often include a host of lateral legs and fractures which stem from the main wellbore of the well toward a hydrocarbon reservoir in the formation.

Such subsea oilfields may accommodate a host of permanently installed equipment at the seabed. For example, in addition to wellhead Christmas tree assemblies and other architecture directly at each well, a host of pumps, manifolds, storage units and other equipment may be distributed about the oilfield according to the designated layout for the site.

This designated layout will generally include hydraulic communication between each tree and a manifold. In this way hydrocarbon production may be routed through the manifold which more specifically directs the production upstream. A pipe, referred to as a "jumper", is generally the tubular structure that is placed between the tree and the manifold to allow the production to travel from the tree to the manifold as indicated. Of course, jumpers may also be utilized in other applications. A jumper pipe may include a simple mono-bore to serve as the conduit through which the production travels. In these circumstances, the presence of a single fluid conduit means that orienting the ends of the jumper for coupling to each of the tree at one end and the manifold at the other does not present any unique challenges.

However, the manifold also serves as an interface through which other hydraulics may be directed at the tree and well. For the jumper this means that a host of added hydraulics beyond the central bore for the production may be provided. For example, additional bores may be provided to allow chemical injection or other treatment fluids. Added bores may also be provided as a means of allowing for hydraulic control over downhole features, for example to open and close different valves in the well or on the tree, or to deploy instrumentation or for a variety of other purposes.

Unfortunately, where the jumper is of a multi-bore variety as described above, this means that the end faces of the jumper include the termination for the central bore as well as terminations for a host of other, generally smaller, bores at perimeter locations of the jumper. Thus, orienting and aligning the end faces of the jumper for proper securing to the coupling locations at each of the tree and the manifold presents a unique challenge. As indicated, due to the fact that the central bore portion of the jumper is generally a 6-8 inch pipe, it is a fairly rigid structure, generally weighing in the tens of thousands of pounds and spanning a distance of about 75 feet or so between the tree and manifold.

When one end of the jumper is effectively coupled, for example to the tree, there is always the probability that the other end will be slightly misaligned from the coupling location on the manifold in terms of bore axial alignment. However, with the rigidity of the jumper in mind, correcting this alignment is more complicated than merely twisting the end face of the rigid pipe a degree or two and into proper orientation with the coupling location on the manifold. Even if this were possible in the face of such rigidity, the amount of torque required to achieve this twisting, combined with the amount of load that would be forced into the jumper itself would make such a maneuver impractical. A tremendous amount of power would be required to achieve this twist only to create a situation where the jumper might be prone to cracking and failure over time due to consistent residually high stress.

For a mono-bore jumper it is often easier to install in a vertical fashion between the tree and the manifold. That is, an "M-shaped" jumper may be dropped vertically from a deployment vessel toward the seabed and one leg of the "U" secured to the tree and the other secured to the manifold. There is no significant concern over the specific orientation of the mono-bore as interfaces the tree at one end and then the manifold at the other. Because only a single central bore need be coupled to each piece of equipment, misaligned orientation is not of significant concern. Thus, this low cost option for deployment and installation is available.

Unfortunately, for multi-bore systems, vertical installation is not a practical option. This is because twisting of the jumper in order to attain alignment between the jumper perimeter bores and the connection interface at the tree and/or manifold is rendered even more impractical where an "M-shaped" type of vertical jumper is involved due to the unrealistic manufacturing tolerances that would be required. There simply would be no practical manner of attaining such a twist for sake of alignment. As a result, horizontal jumpers are instead utilized where multi-bores are concerned.

As alluded to above, twisting in order to attain proper alignment is a challenging undertaking for any type of jumper due to the inherent inflexibility. Thus, in order to incorporate some flexibility into horizontal multi-bore jumpers, they are specially configured with a host of twists and turns. That is, as opposed to merely utilizing straight tubular piping between the tree and the manifold, a host of bends will be introduced to the jumper, resulting in a multi-planar jumper of complex corkscrew-type geometry. In this way, once one end is aligned and secured, for example, at the tree, the other end may be twisted to a degree as necessary for bore alignment with the interface at the manifold. Unfortunately, the addition of bends means that this horizontal multi-bore jumper may be massive in size. For example, even though the tree and manifold might be separated by 75 feet, the jumper may be 180 feet. This adds to material cost and makes deployment and installation much more of a challenge. Unlike a vertical jumper, the barge delivering the horizontal jumper is unlikely to be able to accommodate several such jumpers. Once more, the jumper requires a significant amount of footspace on the sea bed between the tree and manifold. Thus, other lines and equipment may need to be relocated. Nevertheless, as a practical matter, the massive corkscrew type of horizontal jumper remains the only practical option where multi-bore jumpers are to be utilized.

SUMMARY

An interface is provided for coupling a multi-bore jumper to equipment at a seabed. The interface includes a rotatable hub with a central location and a central bore that terminates adjacent this location. However, the hub is rotatable independent of the central bore. The interface also includes at least one perimeter bore which terminates at a perimeter location of the plate and being movable with the plate during any rotation thereof.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to certain subsea operations utilizing manifolds which are fluidly coupled to trees at a seabed. In this manner, production that is drawn from a well and through the tree may be routed through the manifold for directing production. Additional bores, beyond the central production bore, may be found in the jumper which fluidly couples the tree and manifold. Thus, hydraulic control, chemical injection and other applications may be directed at the tree through the manifold. Though, this particular type of system between a tree and manifold is described, such a multi-bore jumper may be utilized to connect a variety of other types of equipment at the seabed. Regardless, so long as the jumper or the equipment includes an interface with a hub accommodating bores which are able to be rotated independent of the central bore, appreciable benefit may be realized.

Figure 1B:
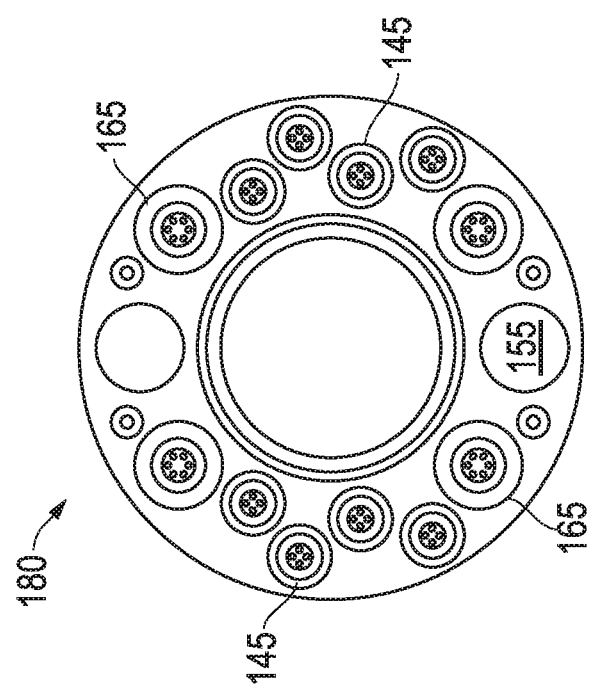
FIG. 1B is a front view of an embodiment of a rotatable hub for coupling to the multi-bore interface of FIG. 1A.
Figure 1A:
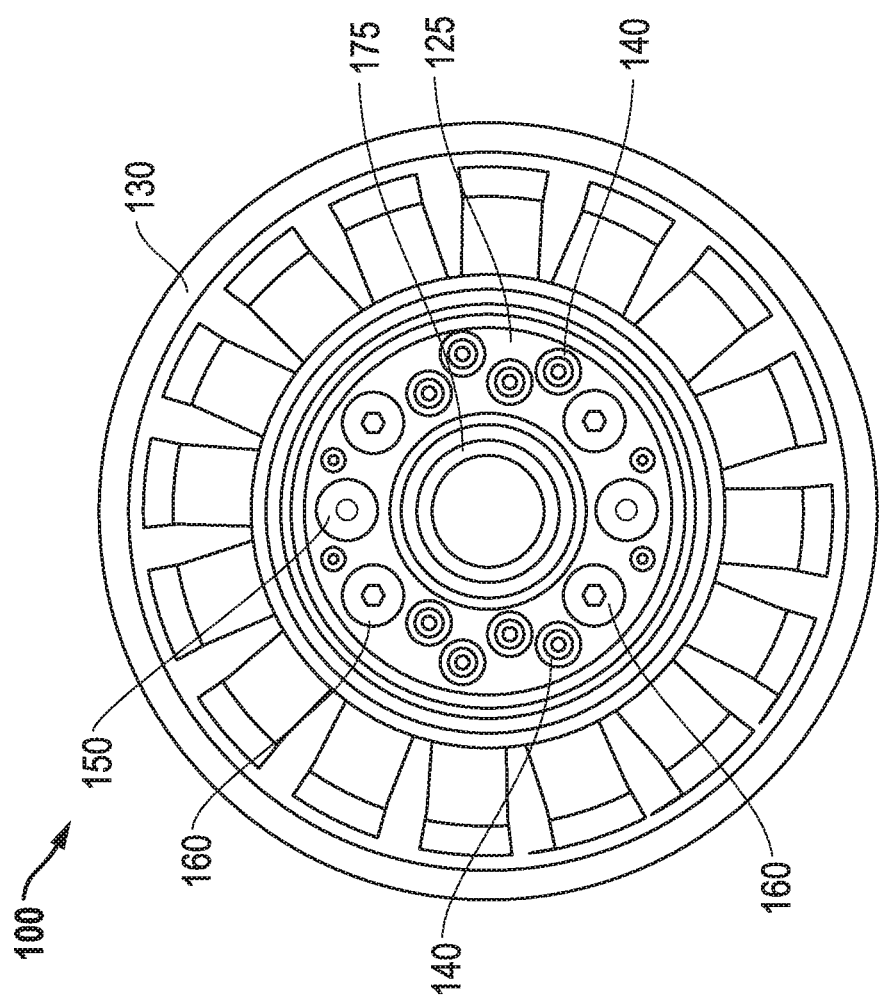
FIG. 1A is a front view of an embodiment of a multi-bore interface for a subsea jumper.

Referring now to FIG. 1A, a front view of an embodiment of a multi-bore interface 100 for a subsea jumper is shown. In this embodiment, the interface 100 is equipped with a connection head 130 that accommodates a rotatable hub 125 that is independently disposed about a central bore 175. More specifically, the central bore 175 may be a 4-12 inch diameter production pipe about which the hub 125 may freely rotate within certain tolerances. That is, rotation of the hub 125 is not impeded by the connection head 130 and outer surrounding structure, nor is it impeded by the inner adjacent structure of the central bore 175.

Continuing with reference to FIG. 1A, the rotatable hub 125 includes locations where perimeter bores (140, 160) terminate. In the embodiment shown, the visible terminal ends of these bores 140, 160 may be in the form of male couplers. In this embodiment, corresponding female couplers 145, 165 may be provided at a seal plate 180 of subsea equipment to which the interface 100 is to be secured (see FIG. 1B). Of course, in other embodiments, the male and female nature of the couplers 140, 160, 145, 165 may be reversed or other suitable coupling configurations employed. Regardless, as shown in FIG. 1A, the terminal ends depicted are the terminal ends of electric 140 and hydraulic 160 bores. As the name suggests, these bores are provided to serve as a conduit for electric 140 or hydraulic 160 control over equipment features, for example, once the interface 100 is fully coupled to subsea equipment such as a tree 425 or manifold 450 (see FIGS. 4A-4C). Of course, perimeter bores 140, 160 may be present for other purposes such as power storage, communications, gas lift, pressurization, chemical injection, and a variety of other applications As is apparent in FIG. 1A, the perimeter bores 140, 160 are smaller and more flexible than the central production bore 175. For example, the perimeter bores 140, 160 may be 1 inch or less in diameter. Additionally, alignment pins 150 extend from the hub 125. These pins 150 may be referred to as "fine" alignment pins 150 in contrast to other types of alignment aids that may be used to initially orient the interface 100 relative the seal plate 180 prior to the more precise alignment provided by the depicted pins 150. For example, an ROV, funneling structure and other forms of guidance may be provided as a jumper 200 and interface 100 are brought to the seal plate 180 of subsea equipment (e.g. see FIGS. 2 and 4A-4C).

Referring now to FIG. 1B, a front view of an embodiment of the above referenced seal plate 180 is shown. As suggested, the seal plate 180 is the location of the subsea equipment to which the interface 100 of FIG. 1A may be securely coupled. In terms of alignment, note the orifices 155 which are provided to accommodate the alignment pins 150 of FIG. 1A. That is, as the pins 150 are brought into the vicinity of, and enter the orifices 155, the pins 150 may be moved by a funneling shape of each orifice 155 as it extends below the surface of the plate 180. Notice that each orifice 155 is considerably larger diameter at the surface of the plate 180 than the pins 150. For example, in the embodiment shown, the orifices 155 may funnel to a degree having an initial diameter that is slightly larger than the diameter of the pins 150. By the same token, the pins 150 may taper near the ends. In this manner, the odds of initial engagement between the ends of the pins 150 and the orifices 155 are enhanced. Following this engagement, the continued downward movement of the pins 150 may result in funneling the pins toward a more centered alignment within the orifices 155.

As detailed further herein, this means that once the interface 100 is roughly aligned with the plate, sufficient for the pins 150 to be caught by the orifices 155, fine alignment may proceed. To the extent that the pins 150 might be off center relative the orifices 155, the downward movement of the pins 150 into the funneling shape of the orifices 155 may move the pins 150 toward each orifice 155 center, rotating the hub 125 as needed. Thus, fine alignment may be attained. Note that this rotating fine alignment is rendered practical due to the hub 125 being rotatable independent of the rigid pipe of the central production bore 175. By the same token, a keyed split ring or other stop device may be incorporated into the interface 100 between the hub 125 and the central production bore 175 to prevent over rotation. That is, while it may be of benefit to allow for a few degrees of corrective rotation, it may also be of benefit to the integrity of the perimeter bores 140, 160, that the amount of torsional load from the rotation be kept to a practical minimum as discussed further below.

Continuing with reference to FIG. 1B, with added reference to FIG. 1A, the pins 150, bores 140, 160 and the entire hub 125 are rotatable about the production bore 175 as indicated. As described above, this means that if the interface 100 of a jumper 200 is not perfectly aligned with a seal plate 180 of subsea equipment 425, 450 as it is being installed, rotatable correction may be made as the coupling sequence is carried out (see also FIGS. 4A-4C). Indeed, in order to attain this rotatable correction in advance of completed coupling, the pins 150 extend out further than the terminal ends of the perimeter bores 140, 160 from the base of the hub 125. In this way, the described corrective rotating may take place before the terminal ends of the bores 140, 160 are to mate with the corresponding female couplers 145, 165 of the seal plate 180.

Figure 2:
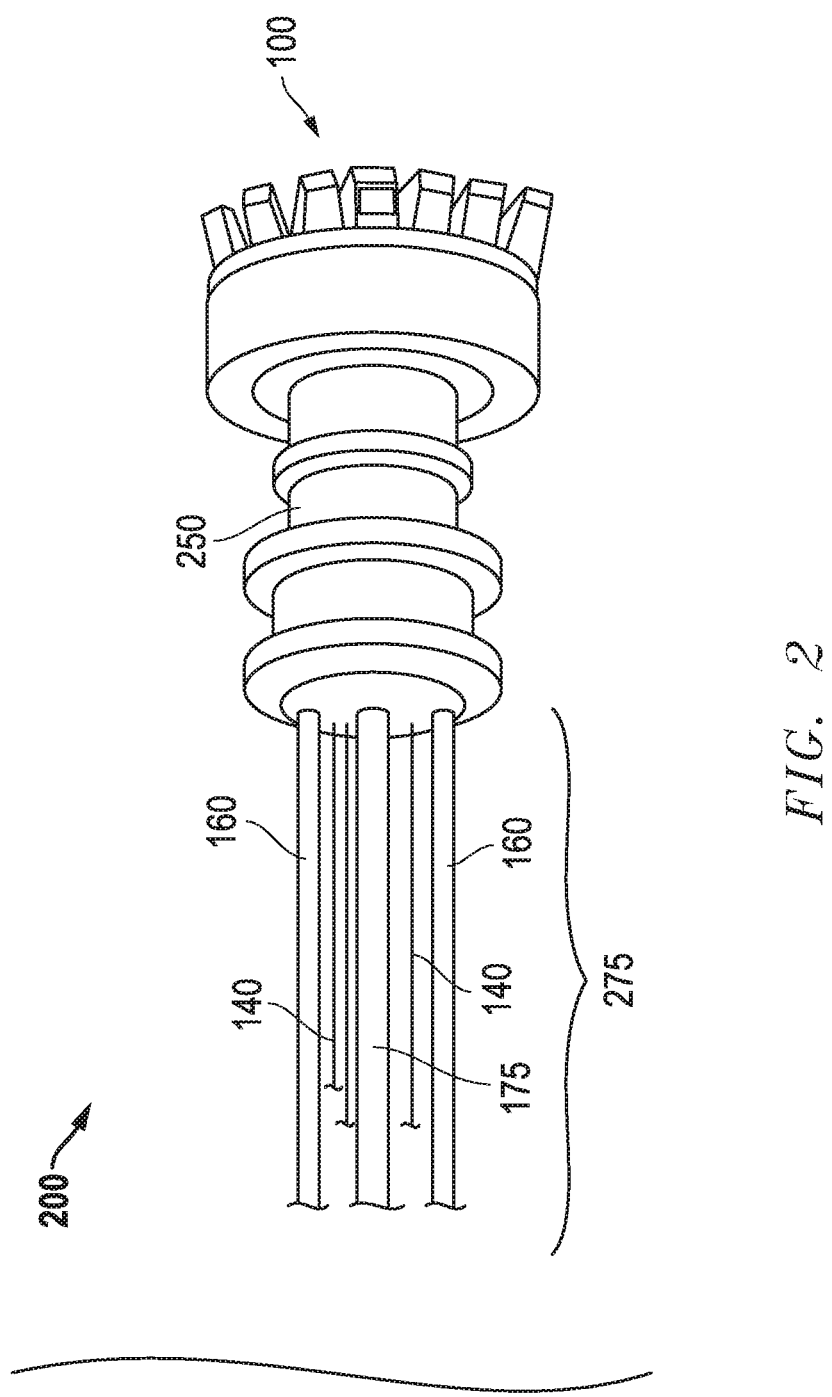
FIG. 2 is a side perspective sectional view of an embodiment of a subsea jumper employing a multi-bore interface.

Referring now to FIG. 2, a side perspective sectional view of an embodiment of a subsea jumper 200 is shown which employs the multi-bore interface 100 of FIG. 1A. In this depiction, the front face of the interface 100 is out of view allowing the perimeter bores 140, 160 and the central bore 175 to be visible from the opposite side of the interface 100 from that of FIG. 1A. More specifically, in this illustration, the bores 140, 160, 175 are shown emerging from a housing 250 adjacent the connection head 130 prior to the addition of protective casing 300 as shown in FIG. 3.

Figure 3:
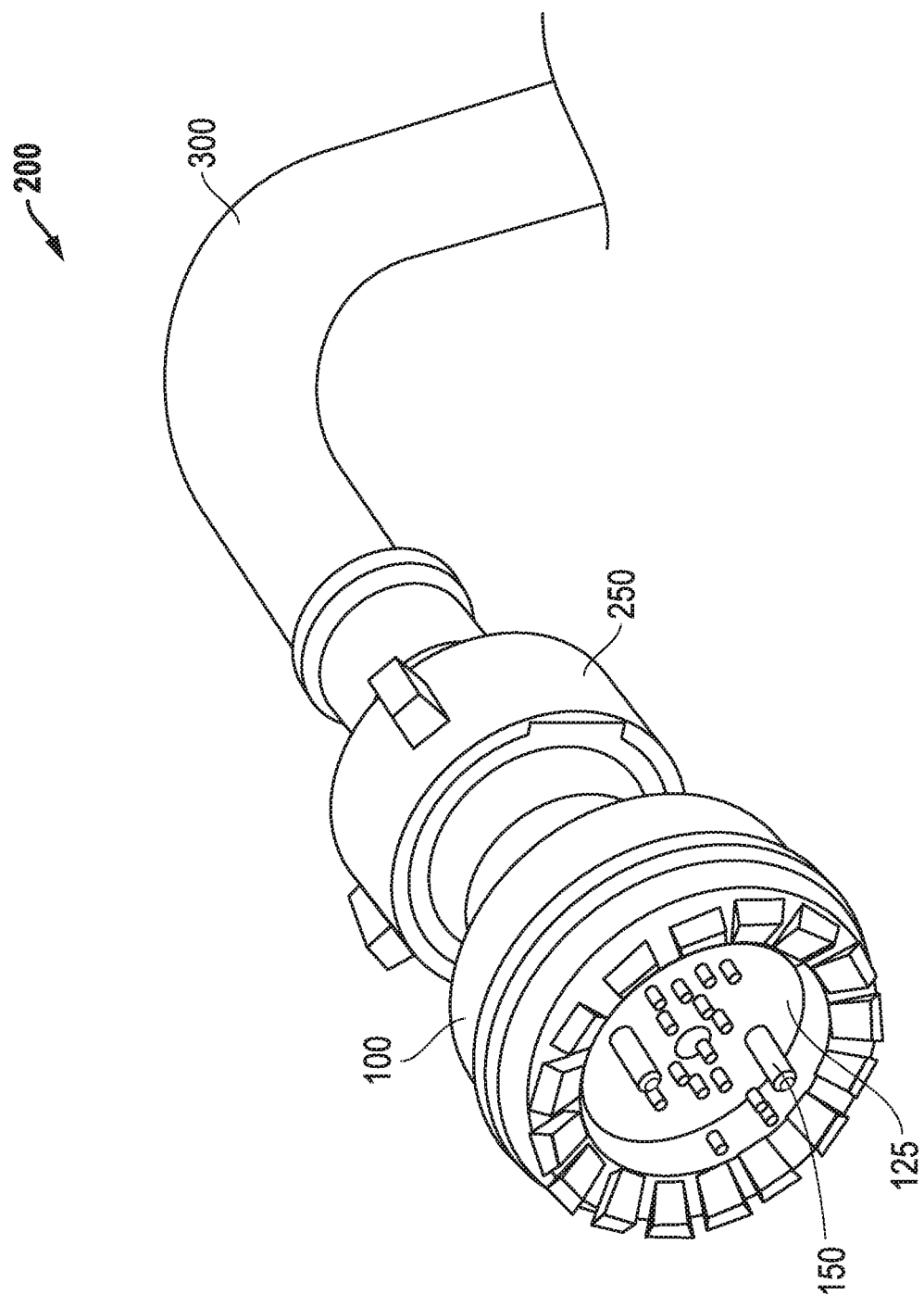
FIG. 3 is a perspective view of an embodiment of a subsea jumper employing a multi-bore interface.

With added reference to FIGS. 1A and 3, once fully assembled, the region 275 which is to be surrounded by protective casing 300 may be occupied by insulating material, in addition to the bores 140, 160, 175. Thus, any twisting or rotation of the hub 125 is unlikely to have any effect on the position or orientation of the perimeter bores 140, 160 in this region 275. However, in order to allow for a degree of perimeter bore twisting about the central bore 175 in response to any rotating of the hub 125 as described above, the housing 250 may be intentionally void of insulation near perimeter locations. Thus, rotating of the hub 125 may translate into twisting of perimeter bores 140, 160 within the housing. As a practical matter, this means that there is a degree of play or freedom within the housing 250 which allows for twisting of these bores 140, 160 about the central bore 175. This twisting may be translated across several feet of the length, as the bores 140, 160 run across the interior of the housing 250. In the embodiment shown, this distance may be between about 2-4 feet (e.g. the length of the housing 250). Keeping in mind that the rotation of the hub 125 to attain proper mating alignment may be no more than a few degrees, limiting this added freedom of movement for the bores 140, 160 to the corresponding length of the housing 250 should be sufficient. However, where a greater degree of hub rotation is sought, the indicated void space may be extended beyond the housing 250 to facilitate perimeter bore twisting across greater distances if so desired.

Referring now to FIG. 3, a perspective view of an embodiment of a subsea jumper 200 is shown which employs a multi-bore interface 100 as detailed above. With brief added reference to FIG. 4A, the fully assembled jumper 200 is configured to provide a multi-bore bridge between two different pieces of equipment at a seabed 400. Given the size of the jumper 200 and the fact that such equipment 425, 450 may be separated by distances of 50 feet or more, the likelihood that both interfaces 100 will be perfectly aligned with both seal plates 180 for coupling are somewhat remote (see FIGS. 1A and 1B). That said, through detailed planning, architecture, mapping and installation techniques, the misalignment between the interfaces 100 and seal plates 180 should generally be well below 5°. However, rather than address this potential misalignment by utilizing a massive, extended length corkscrew jumper with twists and turns that allow for absorbing the torque of such a mismatch, the rotatable multi-bore hub 125 has been provided for each jumper interface 100.

Continuing with reference to FIG. 3, the jumper 200 is shown with protective casing 300 that extends from the housing 250 that leads to the connection head 130. The described interface 100 is outfitted with the rotatable hub 125. More specifically, the hub 125 may be rotated as alignment pins 150 begin to make their way into funnel shaped orifices 155 of the seal plate 180 at seabed equipment 425, 450 (see FIGS. 1B and 4A). Thus, even if the pins 150 are off center or misaligned as they begin to traverse the orifices 155, the hubs 125 at each interface 100 may begin to rotate, bringing the perimeter bores 140, 160 into alignment with corresponding couplers 145, 165 (again, see FIGS. 1B and 4A).

Figure 4A:
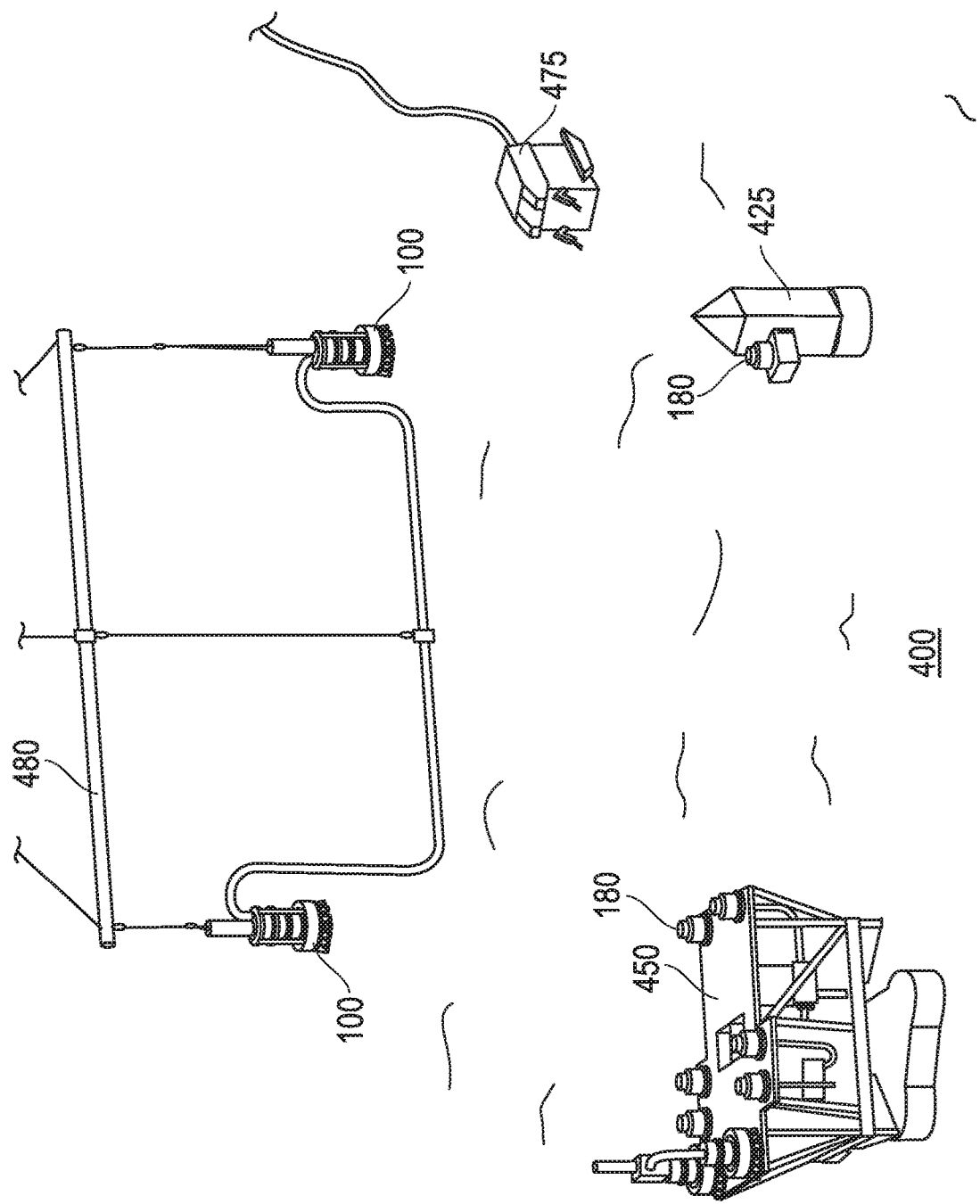
FIG. 4A is an overview depiction of an embodiment of a vertical subsea jumper with a multi-bore interface being delivered to an oilfield.

Referring now to FIG. 4A, an overview depiction of an embodiment of a vertical "M-shaped" subsea jumper 200 is shown with multi-bore interfaces 100 at each end thereof as it is being delivered to an oilfield. Though, a half "M-shaped" configuration may also be utilized. As discussed above, because potential multi-bore misalignment need not be addressed through an extended length horizontal jumper having built in twists and turns, a much smaller profile may be used for the jumper 200. For example, in the embodiment shown, the tree 425 may be distanced from the manifold 450 by about 75 feet. However, the entire length of the jumper 200, including the depicted vertical portions will be less than 150 feet. That is, the jumper 200 may be of a length that is less than twice the distance separating the equipment (425, 450).

In addition to being limited in overall size and profile, notice that the jumper 200 is of a relatively linear shape, occupying a single vertical plane like a wall. Thus, a single support beam 480 may be used to lower the jumper 200 from a delivery vessel at a sea surface above. Positioning aids such as the depicted remote operated vehicle (ROV) 475 may be provided to support visual and, if need be, interventional, assistance as the jumper 200 is lowered.

Due to the reduced profile of the jumper 200, the amount of footspace required at the delivery vessel is also limited. Thus, the vessel may accommodate a host of other equipment to be installed at the seabed 400. Indeed, several such jumpers 200 may be loaded onto the same vessel. This is in stark contrast to the large scale horizontal corkscrew type of jumpers which are otherwise utilized where multi-bore functionality is sought. From manufacture to transportation to installation, appreciable benefit may be realized from utilizing a multi-bore jumper 200 with rotatable hubs 125 at each interface 100 (see FIG. 1A).

Figure 4B:
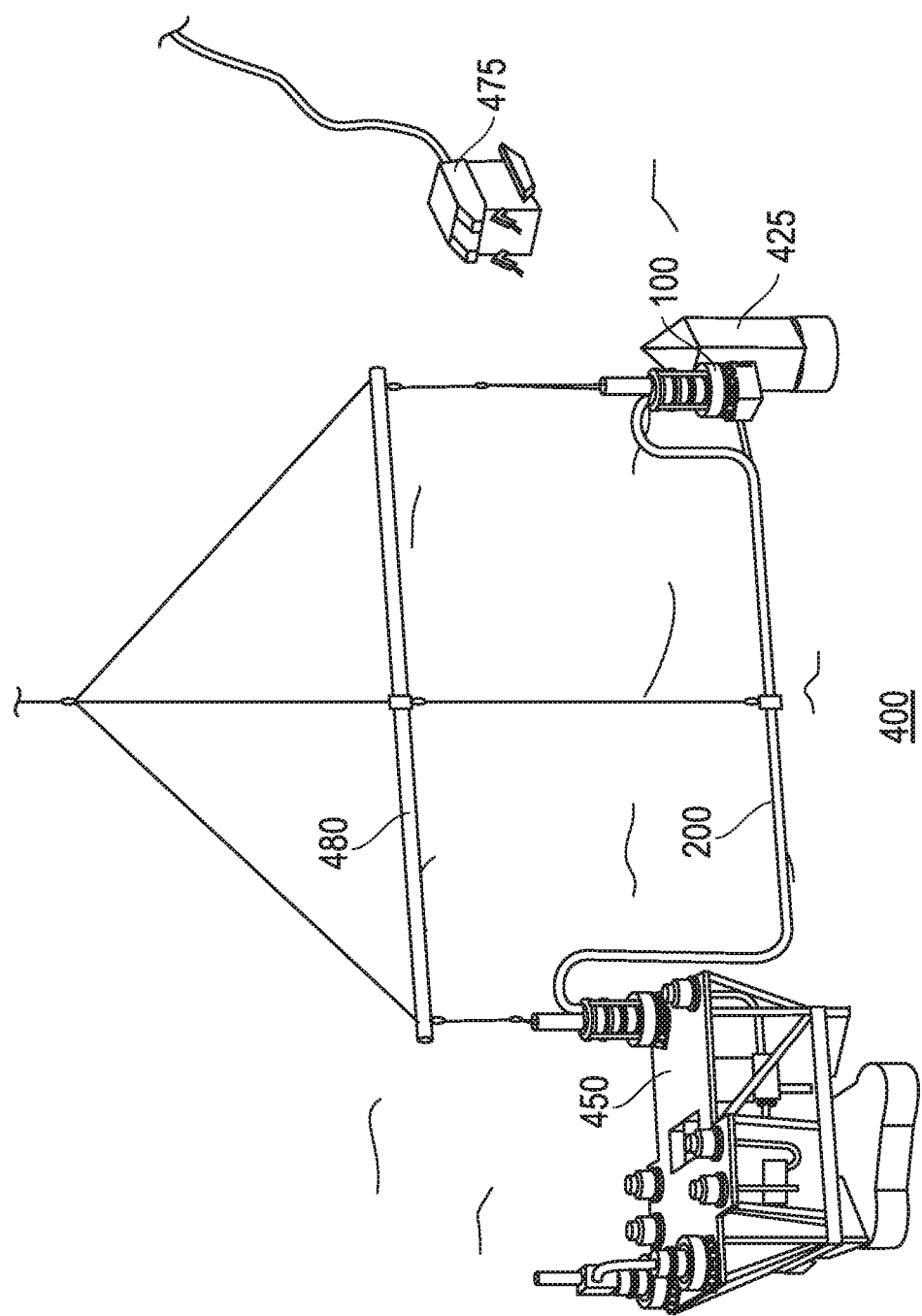
FIG. 4B is an overview depiction of the vertical subsea jumper of FIG. 4A being coupled to equipment at the oilfield.

Referring now to FIG. 4B, an overview depiction of the vertical subsea jumper 200 of FIG. 4A is shown as it is coupled to equipment 425, 450 at the oilfield. With added reference to FIGS. 1A and 1B, as the interfaces 100 approach the seal plates 180 of FIG. 4A, the alignment pins 150 are received by the orifices 155 of the plates 180. In one embodiment, additional pins and larger funneling orifice structures may be utilized as a preliminary form of guidance in directing the pins 150 toward the orifices 155. Similarly, the ROV 475 may be utilized to provide added guidance as indicated above.

Continuing with reference to FIG. 4B with added reference to FIGS. 1A and 1B, once the pins 150 begin advancing into the funneling orifices 155, gravity may continue to direct the position of the pins 150. More specifically, to the extent that the pins 150 of the hubs 125 are off-center relative the orifices 155, the funneling of the pins 150 by the orifices 155 under the several thousand pounds of jumper weight will effect rotation of the hubs 125. In this manner, the rotation of the hubs 125 at each end of the jumper 200 allows for the pins 150 to center within the orifices 155. As a result, the terminal ends of the perimeter bores 140, 160 are aligned with the corresponding couplers 145, 165 of the seal plates 180 (also see FIG. 4A).

Again, with added reference to FIGS. 1A and 1B, rotation of the hubs 125 may take place as indicated at each of the interfaces 100. This may include rotation taking place at each hub 125 in roughly equal measure. So, for example, where alignment of one interface 100 would result in a 5° misalignment of the other interface 100, the completed coupling of the interfaces 100 to the equipment 425, 450 may actually result in a 2½° rotation for each hub 125. Thus, the amount of torque that is placed on each of the perimeter bores 140, 160 at each end of the jumper 200 is limited to a shared overall amount and the hubs 125 have no measurable torsional load during installation due to this architecture.

Figure 4C:
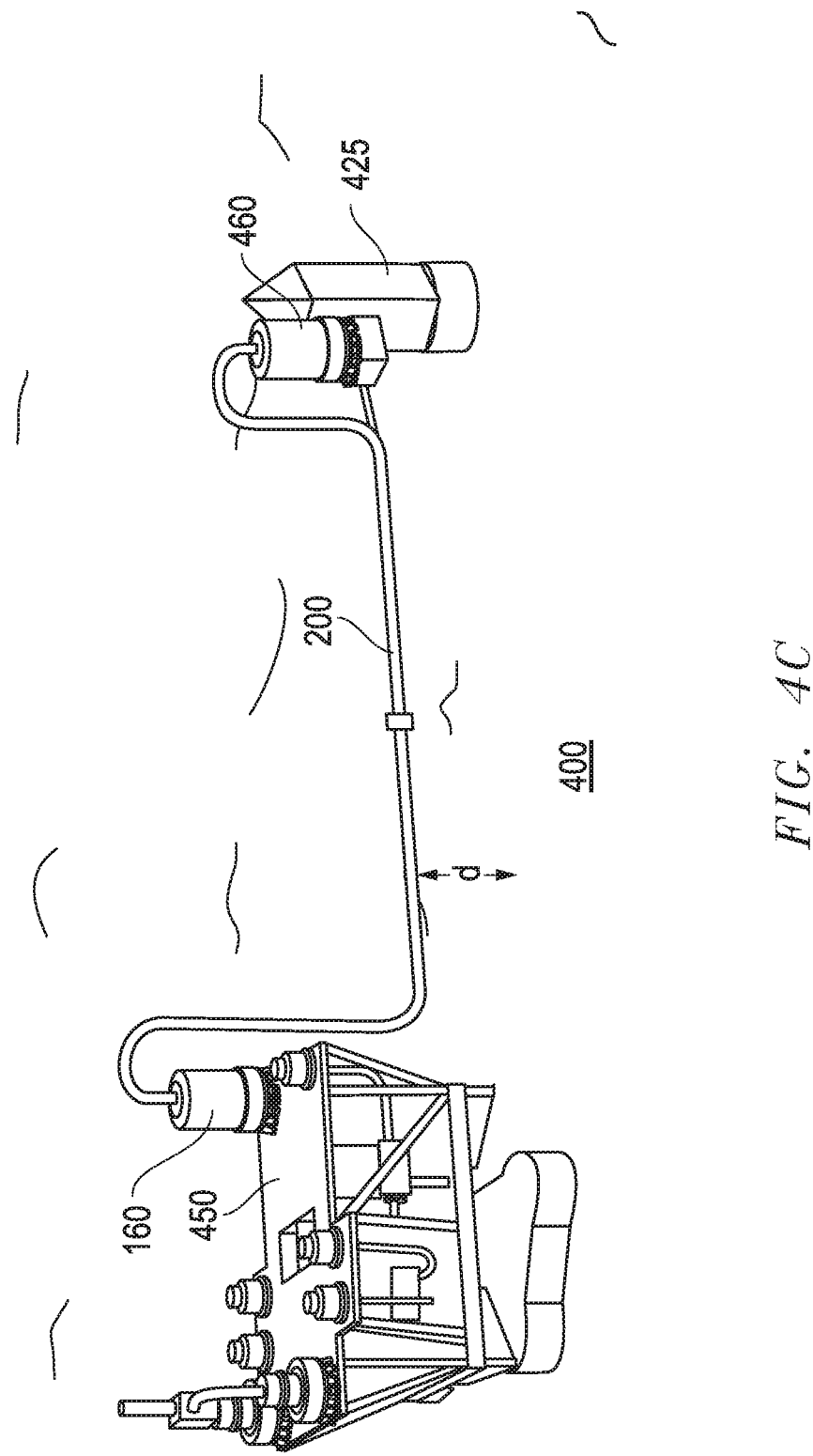
FIG. 4C is an overview depiction of the vertical subsea jumper of FIGS. 4A and 4B upon completed installation at the equipment of the oilfield.

Referring now to FIG. 4C, an overview depiction of the vertical subsea jumper of FIGS. 4A and 4B is shown upon completed installation at the equipment 425, 450 of the oilfield. Though not necessarily required, in this embodiment, a protective cover 460 has been placed over the coupled interface 100. Thus, a permanent multi-bore link between the equipment has been provided in the form of the practical low profile jumper 200. Once more, the smaller size of the jumper 200 means that it may be kept off of the seabed 400. Note the distance (d) between the seabed 400 and the lower portion of the installed jumper 200. As a result, the jumper 200 leaves room for any other lines, cables, hydraulics and other items that are often run across the seabed 400, depending on the oilfield layout.

Figure 5:
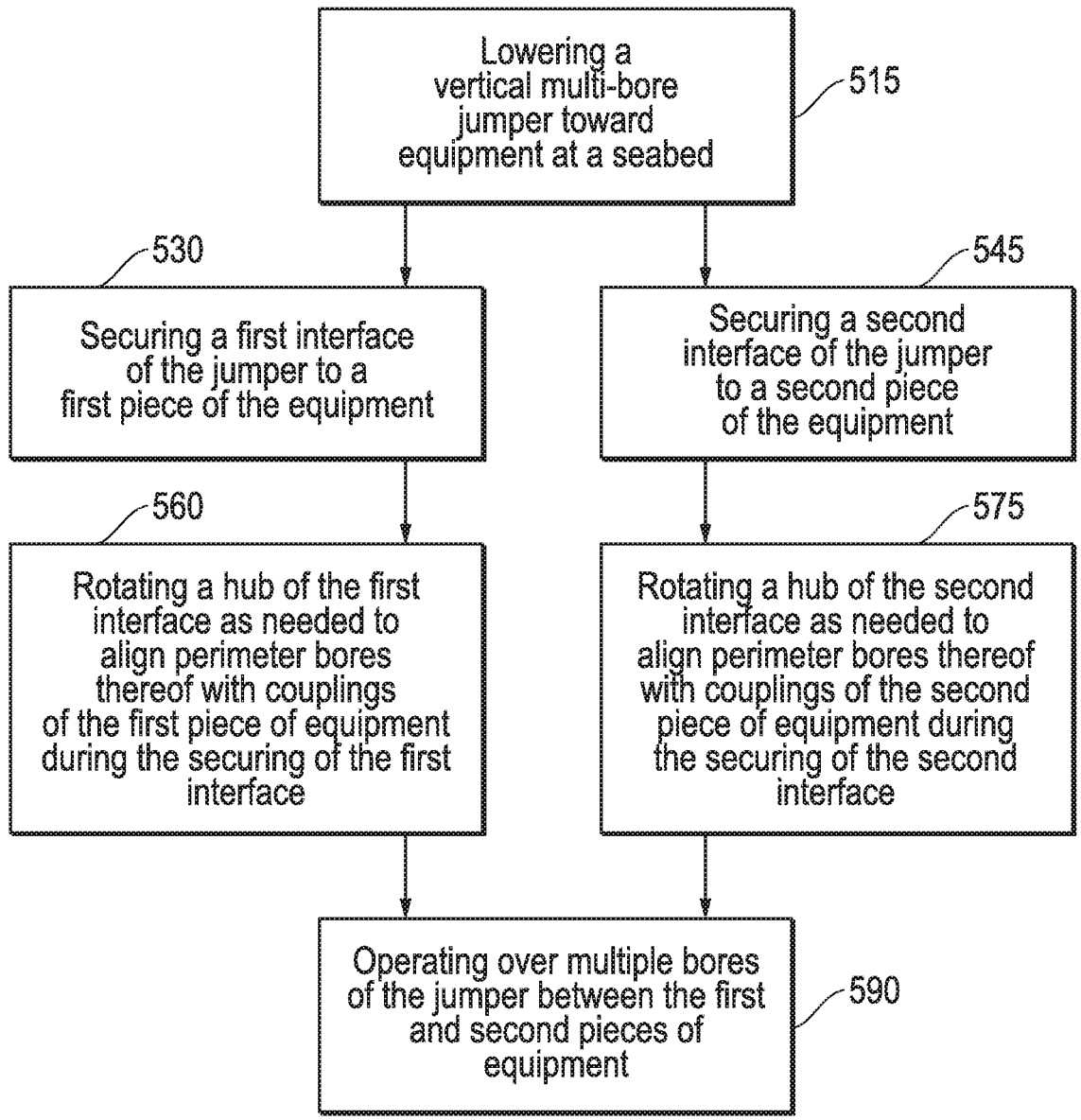
FIG. 5 is a flow-chart summarizing an embodiment of coupling a subsea jumper with a multi-bore interface to equipment at a seabed.

Referring now to FIG. 5, a flow-chart summarizing an embodiment of coupling a vertical subsea jumper with a multi-bore interface to equipment at a seabed. The jumper may be lowered to the location of the equipment by way of gravity as indicated at 515. Once reaching the equipment first and second interfaces of the jumper may be secured to first and second pieces of equipment (see 530, 545). However, as indicated at 560 and 575, this securing may include rotating a hub of the first and second interfaces as needed in order to align perimeter bores of the interfaces with couplings of each piece of equipment. Regardless, once this is securely completed and the jumper fully installed, operating over multiple bores between the pieces of equipment may take place as noted at 590.

Embodiments described above provide a multi-bore vertical jumper that may be of low profile, reduced weight and practically installed. Concern over misalignment or undue torque being placed on such a jumper in order to correct alignment is minimized. Reduced costs in terms of manufacture, transportation and installation. Indeed, even after installation, benefit may be realized in utilizing a low profile jumper that may be kept off of the seabed safeguarding and allowing room for other lines or equipment thereunder.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, the interface with rotating hub is described herein as being incorporated into the jumper. Of course, it may alternatively be incorporated into the equipment at the seabed at the location of the seal plate. In such an embodiment, the seal plate may be incorporated into the jumper or, if so desired, both the seabed equipment and the jumper may make use of interfaces with rotating hubs for coupling to one another. Additionally, the concepts detailed herein may be incorporated into tie-ins other than jumpers. For example, more compact tie-ins for coupling equipment separated by generally shorter distances may employ such concepts. Along these lines, the foregoing description should not be read as pertaining only to the precise structures described and shown in the accompanying drawings, but rather should be read as consistent with and as support for the following claims, which are to have their fullest and fairest scope.

We claim:

1. A connecting interface for coupling a multi-bore jumper to equipment at a seabed with a seal plate, the interface comprising:
   a rotatable hub;
   an alignment pin;
   a central bore terminating adjacent a central location of the hub, the hub rotatable independently, both about the central bore and relative another hub at another interface at an opposite end of the jumper secured to other equipment at the seabed; and
   at least one perimeter bore terminating at a perimeter location of the hub, the perimeter bore movable with the hub during any rotation thereof, the seal plate having a coupler to couple to the perimeter bore and an orifice for receiving the alignment pin to effect the rotation of the hub.

2. The interface of claim 1 wherein the central bore is a production pipe and the at least one perimeter bore is a bore to supply one of electric and hydraulic capacity.

3. The interface of claim 1 wherein the interface is incorporated into one of the jumper and the equipment at the seabed.

4. The interface of claim 3 wherein the equipment at the seabed is one of a tree, a manifold and a pipeline end termination.

5. The interface of claim 1 wherein the at least one orifice is of a greater diameter at a surface of the plate than that of the alignment pin, the orifice of a funnel shape below the surface.

6. The interface of claim 1 wherein the alignment pin extends further from a base of the hub than the perimeter bore to effect the rotation in advance of the coupler coupling to the perimeter bore.

7. A multi-bore tie-in for coupling to first and second pieces of subsea equipment at a seabed to provide multi-bore communication therebetween, the tie-in comprising:
   a first interface with a rotating hub having an alignment pin at a first end of the tie-in, an orifice at a seal plate of the first piece of equipment to receive the pin, the hub about a centrally located bore for coupling to the first piece of equipment; and
   a second interface with a rotating hub having an alignment pin at a second end of the tie-in, the second end opposite the first end, an orifice at a seal plate of the second piece of equipment to receive the pin, the hub about a central bore for coupling to the second piece of equipment, the receiving of the pins by the orifices to effect rotation of the hubs independently of the centrally located bores and one another for the coupling of the tie-in to the pieces of equipment.

8. The multi-bore tie-in of claim 7 further comprising:
protective casing structure running between the first and second interfaces;
at least one perimeter bore running through the casing structure and intersecting each of the rotating hubs; and
insulation in the casing structure with void spaces at perimeter locations to facilitate twisting of the at least one perimeter bore about the central bore during rotation of one of the rotating hubs.

9. The multi-bore tie-in of claim 8 wherein the at least one perimeter bore is more flexible than the central bore.

10. The multi-bore tie-in of claim 7 wherein the tie-in is one of a vertical jumper, an M-shaped jumper and a half M-shaped jumper.

11. The multi-bore tie-in of claim 7 wherein the first piece of equipment is at a given distance from the second piece of equipment at the seabed, the tie-in being less than about twice the given distance in length.

12. The multi-bore tie-in of claim 7 wherein the tie-in is distanced from the seabed during coupling thereof to each of the pieces of equipment.

13. A method comprising:
lowering a vertical multi-bore jumper toward equipment at a seabed;
securing a first interface of the jumper to a first piece of the equipment;
securing a second interface of the jumper to a second piece of the equipment; and
aligning perimeter bores of rotatable hubs of the interfaces with couplings of the first and second pieces of equipment during the securing of the interfaces, the aligning including aligning centrally located bores at the interfaces with centrally located bores at the pieces of equipment and advancing guide pins at one of the rotatable hubs and a seal plate at one of the pieces of equipment into orifices at the other of the rotatable hubs and the seal plates to rotate the hubs independently of the centrally located bores one another for coupling of perimeter bores to couplers at the seal plates.

14. The method of claim 13 wherein the lowering comprises advancing a single support beam securing the jumper toward the seabed.

15. The method of claim 13 further comprising operating over multiple bores of the jumper between the first and second pieces of equipment.

16. The method of claim 15 wherein the operating comprises exercising one of electric and hydraulic control over an equipment feature.

17. The method of claim 15 wherein the operating comprises carrying out an application selected from a group consisting of power storage, communications, gas lift, pressurization and chemical injection.

* * * * *